(12) United States Patent
Lee

(10) Patent No.: US 12,707,028 B2
(45) Date of Patent: Aug. 11, 2026

(54) ARTIFICIAL INTELLIGENCE IMAGE ANALYSIS SYSTEM AND METHOD USING A PREPROCESSING MODEL OF CCTV CAMERA IMAGE DATA

(71) Applicant: Seung Hwan Lee, Seoul (KR)

(72) Inventor: Seung Hwan Lee, Seoul (KR)

( * ) Notice: Subject to any disclaimer, the term of this patent is extended or adjusted under 35 U.S.C. 154(b) by 0 days.

(21) Appl. No.: 19/183,266

(22) Filed: Apr. 18, 2025

(65) Prior Publication Data

US 2026/0149792 A1 May 28, 2026

(30) Foreign Application Priority Data

Jul. 23, 2024 (KR) ........................ 10-2024-0096892

(51) Int. Cl.
*H04N 7/18* (2006.01)
*G06V 20/52* (2022.01)

(52) U.S. Cl.
CPC ............. *H04N 7/181* (2013.01); *G06V 20/52* (2022.01)

(58) Field of Classification Search
CPC ........... H04N 7/18; H04N 7/181; G06V 20/52
USPC .......................................................... 348/143
See application file for complete search history.

(56) References Cited

U.S. PATENT DOCUMENTS 10,147,216 B1 * 12/2018 Miao ...................... G06V 10/82
10,979,625 B2 4/2021 Lee et al.
11,036,998 B2 * 6/2021 Lee ........................ H04N 23/61
11,275,970 B2 * 3/2022 Oleson ..................... G06N 3/08
12,254,751 B2 * 3/2025 Nilsson .................. G06V 20/52
2006/0098729 A1 * 5/2006 Shen ...................... H04N 23/69 348/169
2018/0324390 A1 * 11/2018 Hill ........................ H04N 7/015
2020/0092465 A1 3/2020 Lee et al.

FOREIGN PATENT DOCUMENTS

KR 102201858 B1 1/2021
KR 102346204 B1 1/2022
KR 102346760 B1 1/2022

(Continued)

OTHER PUBLICATIONS

Korean Notice of Allowance dated Feb. 25, 2026 issued in corresponding Korean Patent Appln. No. 10-2024-0096892 (with English translation).

*Primary Examiner* — Trang U Tran
(74) *Attorney, Agent, or Firm* — Harness, Dickey & Pierce, P.L.C.

(57) ABSTRACT

Provided is an artificial intelligence image analysis system and method using a preprocessing model of CCTV camera image data, which not only enhances the performance of the artificial intelligence network model but also improves reliability in response to changes in external environments. The system includes: a CCTV image collection unit configured to collect images captured through a plurality of CCTV cameras installed in designated zones across a plurality of regions; and an image analysis server configured to update an AI CCTV image analysis model to analyze the images by using an AI preprocessing model that is configured to receive raw images collected by the CCTV image collection unit, learn backgrounds and objects in the images based on a reference image of the captured images of the designated zones, and check status information of the CCTV camera.

7 Claims, 9 Drawing Sheets

(56) References Cited

FOREIGN PATENT DOCUMENTS

| | | | |
|---|---|---|---|
| KR | 102376479 | B1 | 3/2022 |
| KR | 102482341 | B1 | 12/2022 |
| KR | 20230033973 | A | 3/2023 |
| KR | 2023-0166410 | A | 12/2023 |

* cited by examiner

【FIG. 1】
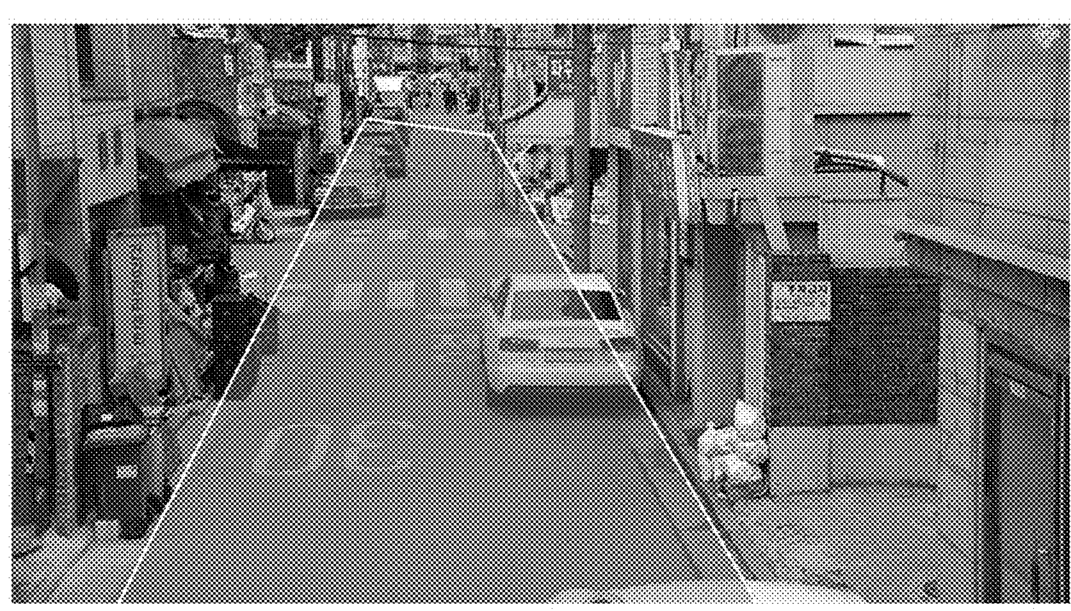

【FIG. 2】
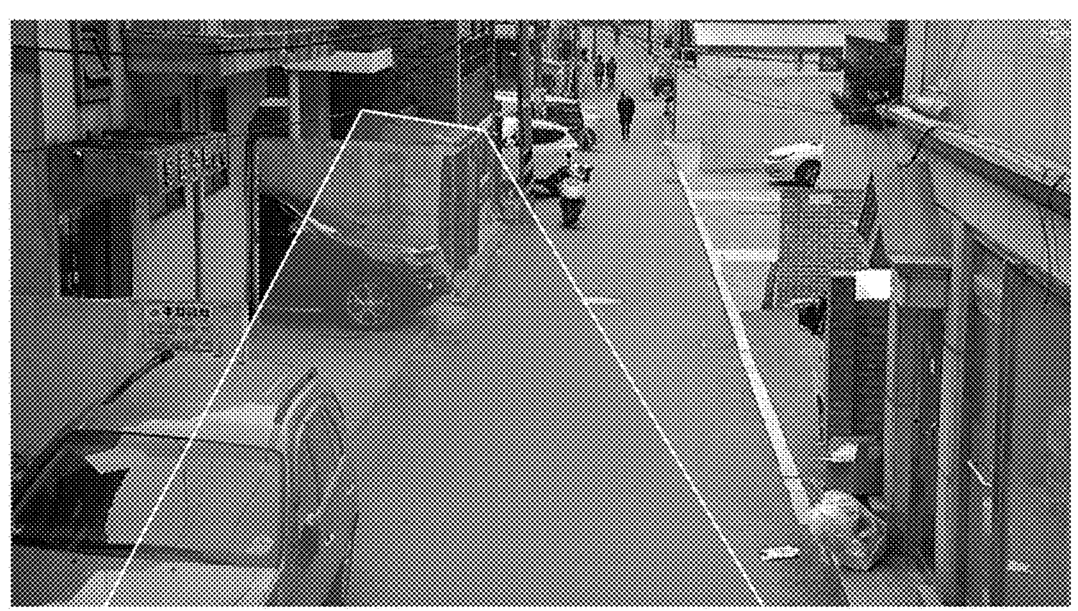

【FIG. 3】
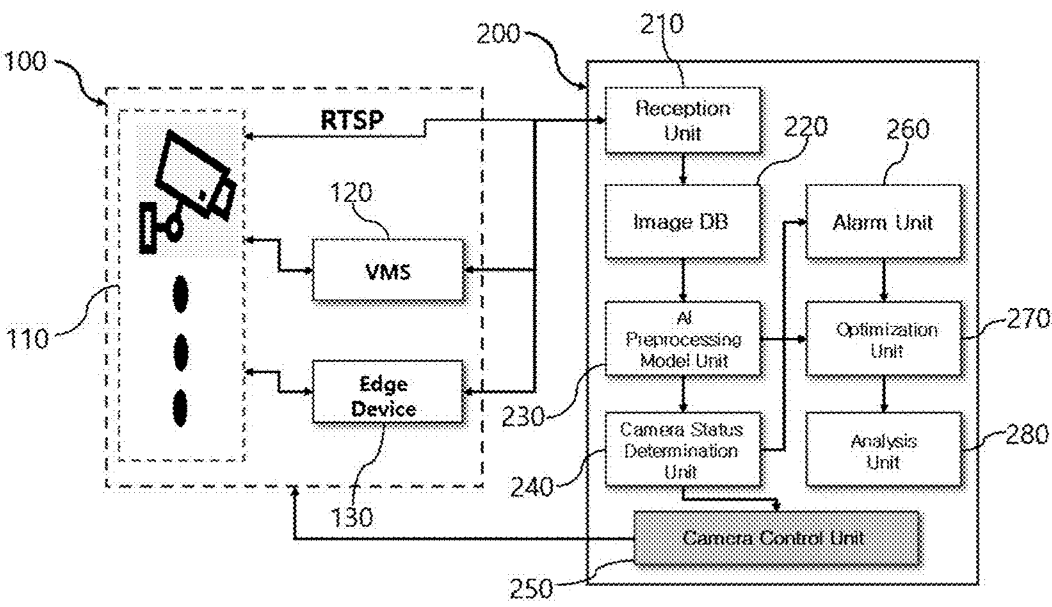

【FIG. 4】
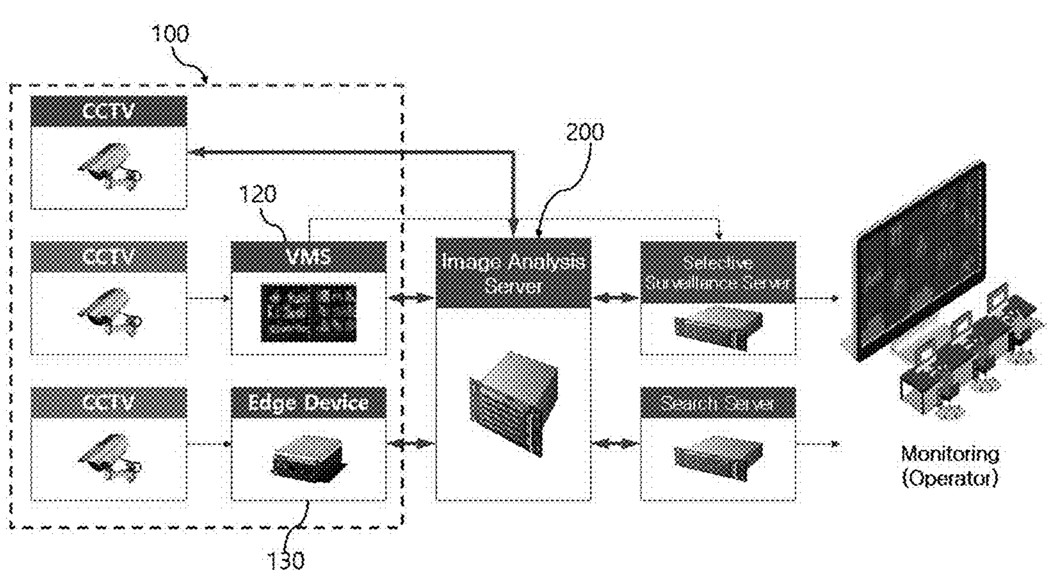

[FIG. 5]

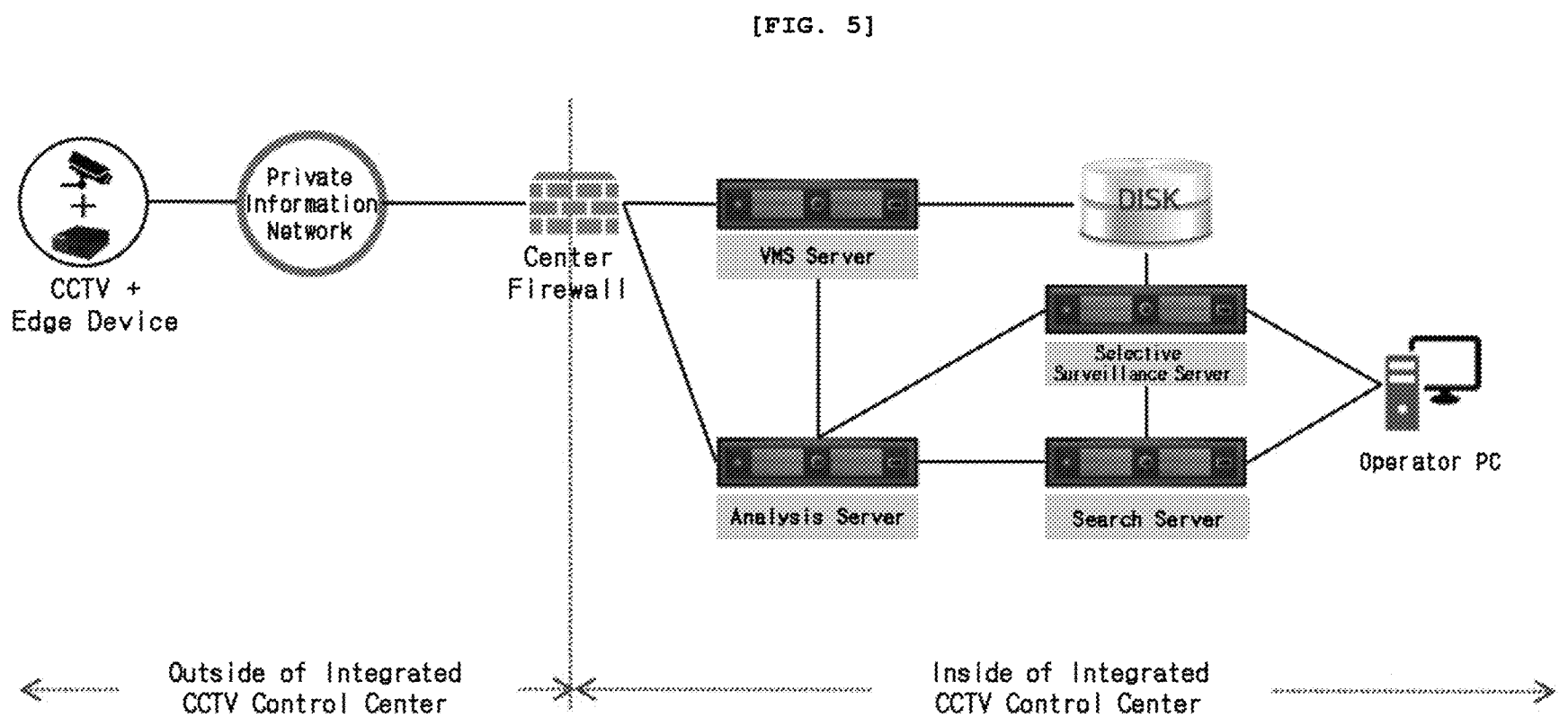

CCTV + Edge Device

Private Information Network

Center Firewall

VMS Server

Analysis Server

DISK

Selective Surveillance Server

Search Server

Operator PC

Outside of Integrated CCTV Control Center

Inside of Integrated CCTV Control Center

【FIG. 6】
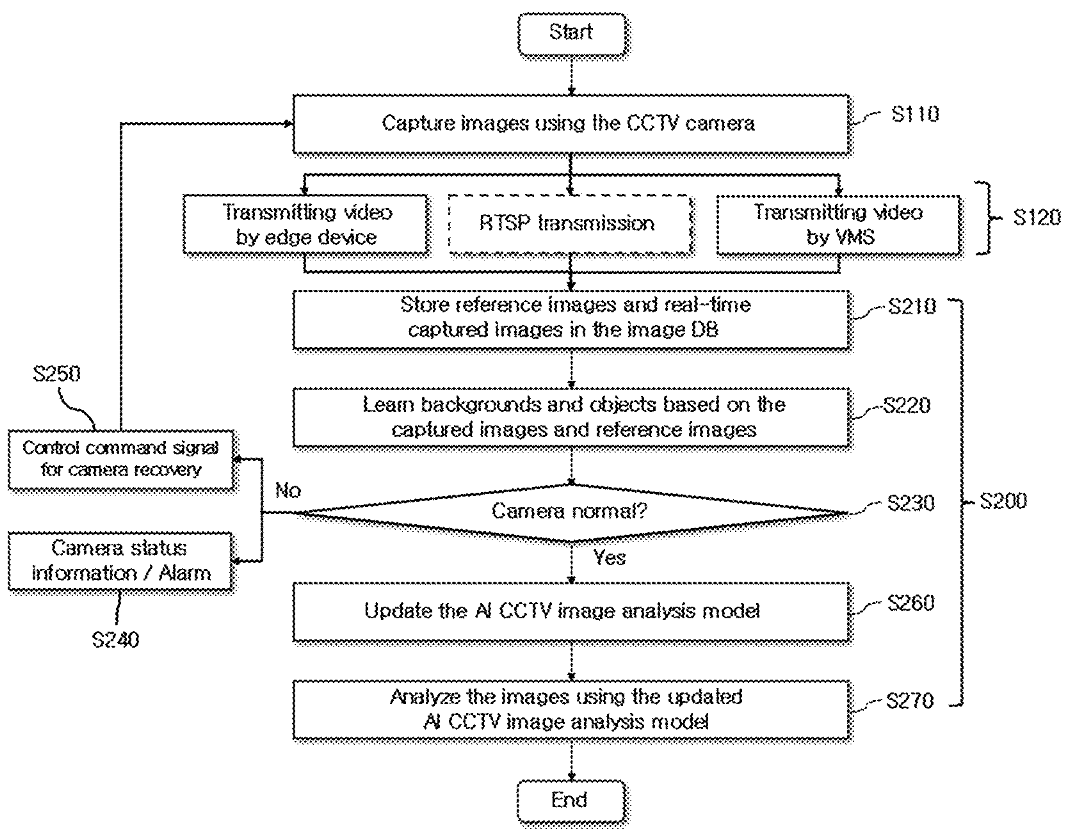

【FIG. 7】
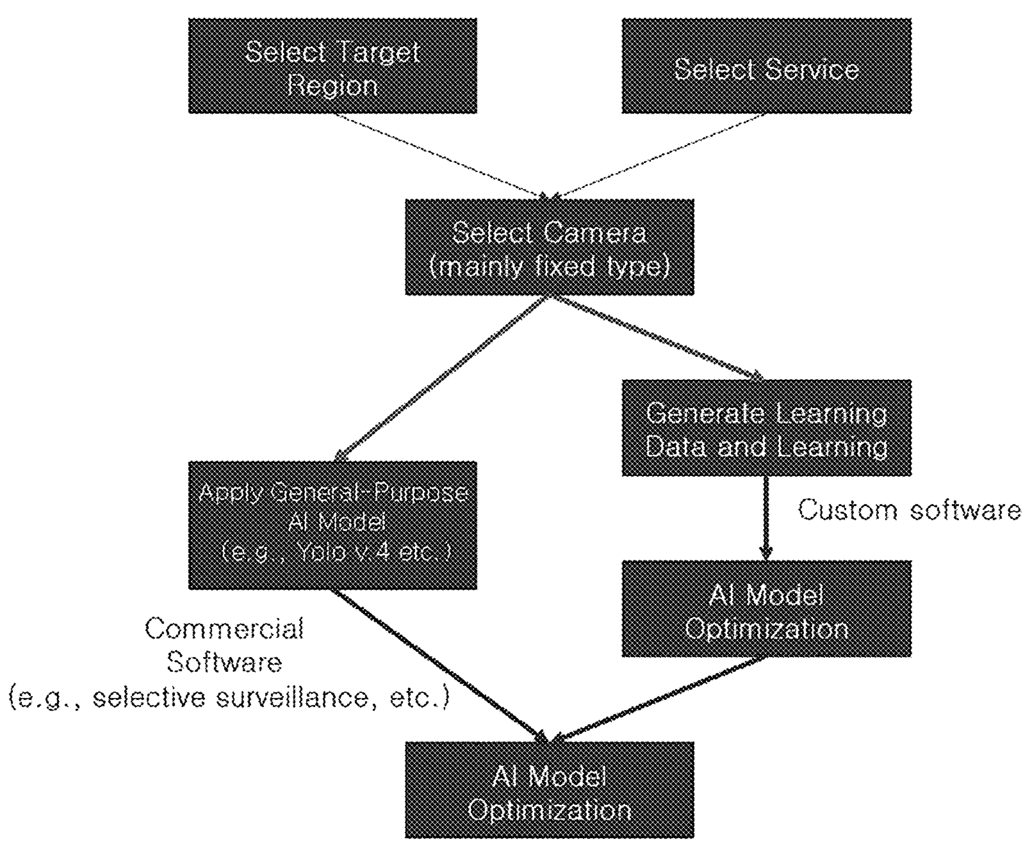

【FIG. 8】
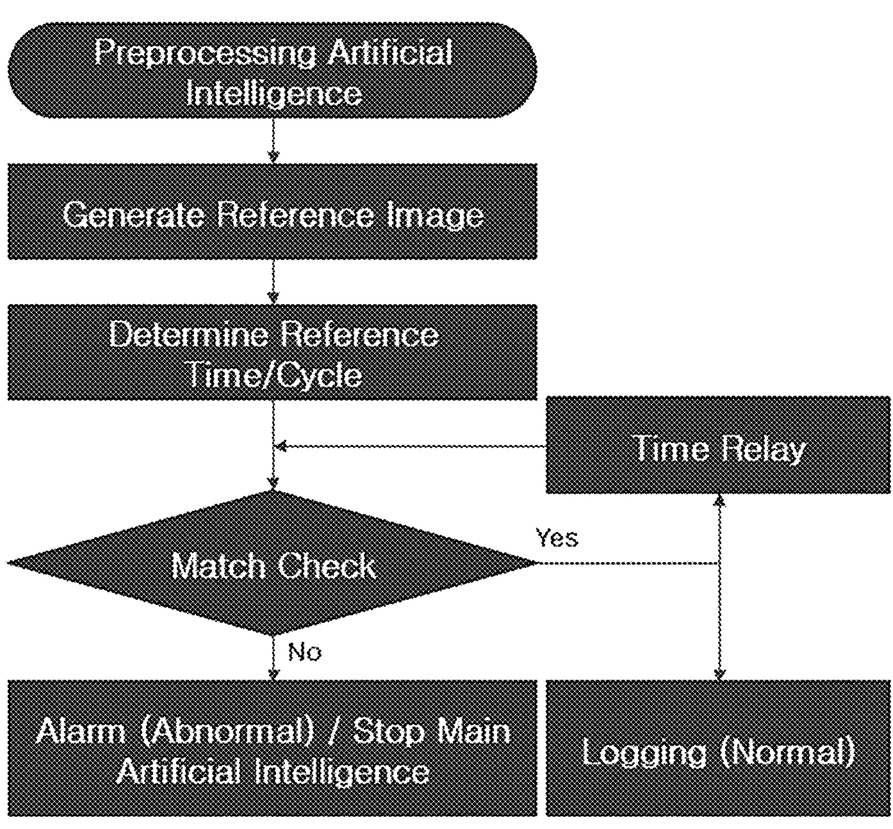

【FIG. 9】
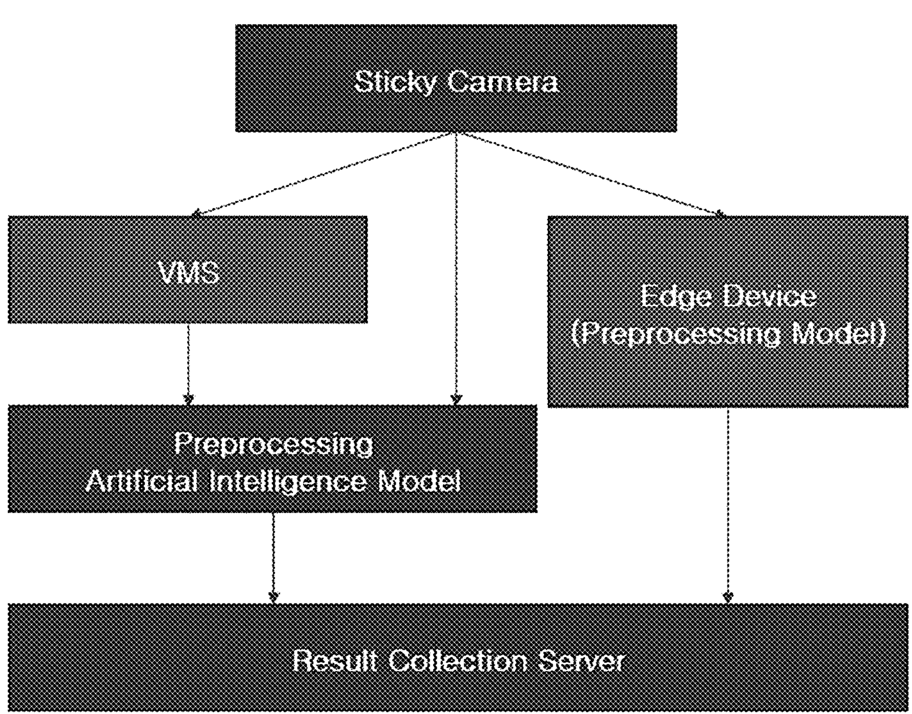

ARTIFICIAL INTELLIGENCE IMAGE ANALYSIS SYSTEM AND METHOD USING A PREPROCESSING MODEL OF CCTV CAMERA IMAGE DATA

CROSS-REFERENCE TO RELATED APPLICATION

This application claims priority to Korean Patent Application No. 10-2024-0096892 filed on Jul. 23, 2024, and all the benefits accruing therefrom under 35 U.S.C. § 119, the contents of which is incorporated by reference in its entirety.

BACKGROUND OF THE DISCLOSURE

1. Field of the Disclosure

The present disclosure relates to a CCTV image analysis system and method. In particular, the present disclosure relates to an artificial intelligence image analysis system and method using a preprocessing model of CCTV camera image data, which is capable of improving reliability in response to changes in external environments.

2. Description of the Related Art

Neural Language Models (NLM), including ChatGPT, are rapidly spreading as a new standard of artificial intelligence. Neural network-based image analysis using the core technology known as the Transformer is also being applied in various forms.

The beginning of artificial intelligence in image analysis can be traced back to OpenCV. By utilizing a variety of libraries, it enabled matrix-based image analysis, laying the groundwork for the development of machine learning.

Machine learning is optimized for detecting specific objects or identifying behavioral patterns within a predefined background. It is particularly effective when identifying objects in a fixed scene.

In contrast, neural network learning is a generalized training technique that can identify universal answers from either a single image or a sequence of images, regardless of background settings. In other words, when the background of the scene changes, neural network learning and inference techniques are most suitable; whereas when the background remains fixed, machine learning yields optimal results.

FIG. 1 illustrates a screen in which a region of interest (ROI) is designated for a fixed CCTV camera for the purpose of machine learning, and FIG. 2 illustrates a screen captured by the same camera, where the ROI setting remains unchanged, but the camera is oriented in a different direction due to factors such as an external impact (external force) or bolt loosening (internal force).

As illustrated in FIGS. 1 and 2, changes in the angle of view may cause the same object to appear in different forms, and when such variations are processed through neural network-based learning and inference, it becomes difficult to achieve reliable results in terms of object detection. However, if each screen is fixed and used as a reference for machine learning, high reliability can be achieved in object detection.

As such, CCTV control centers operated by local governments across the country manage thousands of CCTV cameras to achieve objectives such as crime prevention, traffic control, and disaster response. However, as described above, the performance and reliability of image analysis are degraded due to variations in the captured footage caused by differences in camera angles of view and installation heights of CCTV cameras.

RELATED PATENT DOCUMENT

Korean Registered Patent No. 10-2346204 (Jan. 3, 2022)
Korean Registered Patent No. 10-2201858 (Jan. 12, 2021)

SUMMARY OF THE DISCLOSURE

The purpose of the present disclosure, which aims to solve the aforementioned conventional problems, is to provide an artificial intelligence image analysis system and method using a preprocessing model of CCTV camera image data, which not only improves the performance of an artificial intelligence network model but also enhances performance and reliability in response to changes in external environments.

In addition, the purpose of the present disclosure is to provide an artificial intelligence image analysis system and method using a preprocessing model of CCTV camera image data, which can be applied to both machine learning and neural network techniques for fixed CCTV cameras operated by public institutions.

In addition, the purpose of the present disclosure is to provide an artificial intelligence image analysis system and method using a preprocessing model of CCTV camera image data, which enhances the reliability of machine learning used for image analysis and enables neural network applications to produce highly reliable results through generalized learning.

In order to achieve the purpose, an aspect of the present disclosure provides an artificial intelligence image analysis system using a preprocessing model of CCTV camera image data, the system comprising: a CCTV image collection unit configured to collect images captured through a plurality of CCTV cameras installed in designated zones across a plurality of regions; and an image analysis server configured to update an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera.

In some exemplary embodiments, the CCTV image collection unit may include: a CCTV camera configured to capture images of the designated zones; and an image collection unit configured to collect the captured images and transmit the collected images to the image analysis server.

In some exemplary embodiments, the image collection unit may be configured to: transmit the captured images to the image analysis server through a video management system (VMS) or an edge device; or transmit the captured images by the CCTV camera to the image analysis server using dual RTSP (Real-Time Streaming Protocol).

In some exemplary embodiments, the image analysis server may include: an image database configured to store images received from the CCTV image collection unit; an AI preprocessing model unit configured to learn backgrounds and objects in the designated zones based on the images stored in the image database and the reference image; a camera status determination unit configured to extract status information of the CCTV camera from data generated by the AI preprocessing model unit; an alarm unit configured to generate alarm information when the camera status determination unit determines that a status of the CCTV camera is abnormal; a camera control unit configured to generate a camera control command signal for restoring the status of the CCTV camera to a status corresponding to the reference image based on the status information of the CCTV camera determined as abnormal, and transmit the camera control command signal to the CCTV image collection unit; an optimization unit configured to update the AI CCTV image analysis model by training the AI CCTV image analysis model based on data learned by the AI preprocessing model unit; and an analysis unit configured to analyze the images by using the updated AI CCTV image analysis model.

In some exemplary embodiments, the status information of the CCTV camera may include at least one of zoom information, angle of view information, screen obstruction information, focus information, or a combination thereof, of the image captured by the CCTV camera.

In addition, in order to achieve the purpose, another aspect of the present disclosure provides an artificial intelligence image analysis method using a preprocessing model of CCTV camera image data, the method comprising: (a) collecting, by a CCTV image collection unit, images captured through a plurality of CCTV cameras installed in designated zones across a plurality of regions; and (b) updating, by an image analysis server, an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera.

In some exemplary embodiments, the step (a) may include: (a1) transmitting, by the image collection unit, the captured images to the image analysis server through a video management system (VMS) or an edge device; or (a2) transmitting, by the CCTV camera, the captured images to the image analysis server using dual RTSP (Real-Time Streaming Protocol).

In some exemplary embodiments, the step (b) may include: (b1) storing, by an image database, images received from the CCTV image collection unit; (b2) learning, by an AI preprocessing model unit, backgrounds and objects in the designated zones based on the images stored in the image database and the reference image; (b3) extracting, by a camera status determination unit, status information of the CCTV camera from data generated by the AI preprocessing model unit; (b4) generating, by an alarm unit, alarm information when the camera status determination unit determines that a status of the CCTV camera is abnormal; (b5) generating, by a camera control unit, a camera control command signal for restoring the status of the CCTV camera to a status corresponding to the reference image based on the status information of the CCTV camera determined as abnormal, and transmitting the camera control command signal to the CCTV image collection unit; (b6) updating, by an optimization unit, the AI CCTV image analysis model by training the AI CCTV image analysis model based on data learned by the AI preprocessing model unit; and (b7) analyzing, by an analysis unit, the images by using the updated AI CCTV image analysis model.

In some exemplary embodiments, the status information of the CCTV camera may include at least one of zoom information, angle of view information, screen obstruction information, focus information, or a combination thereof, of the image captured by the CCTV camera.

In addition, in order to achieve the purpose, still another aspect of the present disclosure provides a computer program stored in a medium for executing the aforementioned artificial intelligence image analysis method using a preprocessing model of CCTV camera image.

Specific details of other exemplary embodiments are included in "Details for carrying out the invention" and accompanying "drawings".

Advantages and/or features of the present disclosure, and a method for achieving the advantages and/or features will become obvious with reference to various exemplary embodiments to be described below in detail together with the accompanying drawings.

However, the present disclosure is not limited only to a configuration of each exemplary embodiment disclosed below, but may also be implemented in various different forms. The respective exemplary embodiments disclosed in this specification are provided only to complete disclosure of the present disclosure and to fully provide those skilled in the art to which the present disclosure pertains with the category of the present disclosure, and the present disclosure will be defined only by the scope of each claim of the claims.

According to the present disclosure, the AI preprocessing model can automatically detect and correct abnormal conditions of the camera, such as zoom, orientation, screen obstruction, and focus failure, thereby maintaining the consistency of the video. This enhances the accuracy of background and object detection, and when an abnormal condition is detected, an alarm is immediately generated to enable the operator to respond quickly.

In addition, according to the present disclosure, by preprocessing data in real time at the field level through an edge device, the load on the analysis server can be reduced, and fast data processing enabled. Furthermore, by performing part of the preprocessing at the edge device before data transmission, the amount of data transmitted to the analysis server can be minimized.

Moreover, according to the present disclosure, the AI analysis model can be updated or optimized based on the data learned by the AI preprocessing model, thereby providing high-quality analysis results and enabling stable analysis even when the camera status changes.

According to the present disclosure, it is also possible not only to provide an alarm by checking changes in the camera's angle of view, focus, and zoom in real time, but also to restore the camera to its normal state through control, allowing for integrated and convenient management of CCTV cameras and securing high-quality and consistent CCTV footage that enhances the performance and reliability of AI-based CCTV image analysis.

In addition, the present disclosure enables centralized management of all CCTV images via the VMS server, and efficient data analysis in connection with the analysis server when needed. The operator can monitor images in real time through a monitoring system and respond immediately to abnormal situations.

Furthermore, the present disclosure can reduce operational costs by applying a low-power, low-heat ARM CPU, and reduce the burden on operating personnel and labor costs through an automated alarm and status detection system.

According to the present disclosure, standardized interfaces (e.g., API, CGI, RTSP) are used, enabling system application in various environments. This improves the scalability of the system and ensures reliability by complying with the Ministry of the Interior and Safety's guidelines for intelligent CCTV construction and operation, thereby supporting the development and demonstration of a standard service model.

Moreover, the present disclosure allows the operator to respond promptly through a filtering control server, which detects specific events (e.g., intrusion, accidents) and generates alarms, recommending only relevant events on the screen. In addition, a search server stores analyzed data and allows the operator to retrieve and analyze images from specific time periods when necessary.

In addition, according to the present disclosure, centralized management and analysis of all images are possible at the integrated CCTV control center, improving operational efficiency.

Integration with various servers (VMS server, analysis server, filtering control server, search server) enhances the overall efficiency of system operation.

BRIEF DESCRIPTION OF THE DRAWINGS

FIG. 1 is a screen in which a region of interest (ROI) is designated for a fixed CCTV camera for machine learning.

FIG. 2 is a screen captured by the same camera that is oriented in a different direction due to factors such as bolt loosening or an accident, while the ROI setting remains unchanged.

FIG. 3 is a block diagram illustrating the configuration of an artificial intelligence image analysis system using a preprocessing model of CCTV camera image data according to an exemplary embodiment of the present disclosure.

FIG. 4 is a schematic diagram illustrating the operation of the artificial intelligence image analysis system using a preprocessing model of CCTV camera image data according to an exemplary embodiment of the present disclosure.

FIG. 5 is a diagram showing the network structure of the artificial intelligence image analysis system using a preprocessing model of CCTV camera image data according to an exemplary embodiment of the present disclosure.

FIG. 6 is a flowchart illustrating the detailed process of the artificial intelligence image analysis method using a preprocessing model of CCTV camera image data according to an exemplary embodiment of the present disclosure.

FIG. 7 is a schematic diagram showing an application example of the artificial intelligence image analysis system and method using a preprocessing model of CCTV camera image data according to an exemplary embodiment of the present disclosure.

FIG. 8 is a flowchart illustrating the processing procedure of the AI preprocessing model applied in the artificial intelligence image analysis method using CCTV camera image data according to an exemplary embodiment of the present disclosure.

FIG. 9 is a diagram exemplifying how the artificial intelligence image analysis method using a preprocessing model of CCTV camera image data according to the present disclosure can be applied from the perspective of a CCTV control center.

DETAILED DESCRIPTION OF THE DISCLOSURE

Before describing the present disclosure in detail, the terms or words used in this specification should not be construed as being unconditionally limited to their ordinary or dictionary meanings, and in order for the inventor of the present disclosure to describe his/her disclosure in the best way, concepts of various terms may be appropriately defined and used, and furthermore, the terms or words should be construed as means and concepts which are consistent with a technical idea of the present disclosure.

That is, the terms used in this specification are only used to describe preferred embodiments of the present disclosure, and are not used for the purpose of specifically limiting the contents of the present disclosure, and it should be noted that the terms are defined by considering various possibilities of the present disclosure.

Further, in this specification, it should be understood that, unless the context clearly indicates otherwise, the expression in the singular may include a plurality of expressions, and similarly, even if it is expressed in plural, it should be understood that the meaning of the singular may be included.

In the case where it is stated throughout this specification that a component "includes" another component, it does not exclude any other component, but may further include any other component unless otherwise indicated.

Furthermore, it should be noted that when it is described that a component "exists in or is connected to" another component, this component may be directly connected or installed in contact with another component, and in inspect to a case where both components are installed spaced apart from each other by a predetermined distance, a third component or means for fixing or connecting the corresponding component to the other component may exist, and the description of the third component or means may be omitted.

On the contrary, when it is described that a component is "directly connected to" or "directly accesses" to another component, it should be understood that the third element or means does not exist.

Similarly, it should be construed that other expressions describing the relationship of the components, that is, expressions such as "between" and "directly between" or "adjacent to" and "directly adjacent to" also have the same purpose.

In addition, it should be noted that if terms such as "one side surface", "other side surface", "one side", "other side", "first", "second", etc., are used in this specification, the terms are used to clearly distinguish one component from the other component and a meaning of the corresponding component is not limited used by the terms.

Further, in this specification, if terms related to locations such as "upper", "lower", "left", "right", etc., are used, it should be understood that the terms indicate a relative location in the drawing with respect to the corresponding component and unless an absolute location is specified for their locations, these location-related terms should not be construed as referring to the absolute location.

Further, in this specification, in specifying the reference numerals for each component of each drawing, the same component has the same reference number even if the component is indicated in different drawings, that is, the same reference number indicates the same component throughout the specification.

In the drawings attached to this specification, a size, a location, a coupling relationship, etc. of each component constituting the present disclosure may be described while being partially exaggerated, reduced, or omitted for sufficiently clearly delivering the spirit of the present disclosure, and thus the proportion or scale may not be exact.

Further, hereinafter, in describing the present disclosure, a detailed description of a configuration determined that may unnecessarily obscure the subject matter of the present disclosure, for example, a detailed description of a known technology including the prior art may be omitted.

Moreover, one or more "unit" described in this specification can be implemented via a non-transitory memory (not shown) and a processor (not shown). The memory is configured to store data concerning algorithms designed to control the operation of system components according to exemplary embodiments of the present disclosure, or software instructions that implement these algorithms. The processor is configured to perform the operations described below using the data stored in the memory. Here, the memory and the processor may be implemented as separate chips. Alternatively, the memory and the processor may be implemented as a single integrated chip. The processor may take the form of one or more processors.

Furthermore, in the specification of the present disclosure, terms such as "unit," "device," "module," and "apparatus," if used, refer to a unit capable of processing one or more functions or operations and should be understood to be implementable in hardware, software, or a combination of hardware and software.

As will be understood by those skilled in the art, the realization of all or some of the steps of the above exemplary embodiments may be accomplished through hardware, or may be accomplished by directing the relevant hardware through a computer program. The computer program may include instructions for executing some or all of the steps of the method, the computer program may be stored on a readable storage medium, and the storage medium may be any form of storage medium.

Hereinafter, exemplary embodiments of the present disclosure will be described in detail with reference to related drawings.

FIG. 3 is a block diagram illustrating the configuration of an artificial intelligence image analysis system using a preprocessing model of CCTV camera image data according to an exemplary embodiment of the present disclosure, FIG. 4 is a schematic diagram illustrating the operation of the artificial intelligence image analysis system using a preprocessing model of CCTV camera image data according to an exemplary embodiment of the present disclosure, and FIG. 5 is a diagram showing the network structure of the artificial intelligence image analysis system using a preprocessing model of CCTV camera image data according to an exemplary embodiment of the present disclosure.

As shown in FIG. 3, an artificial intelligence image analysis system using a preprocessing model of CCTV camera image data according to an exemplary embodiment of the present disclosure may include a CCTV image collection unit 100 configured to collect images captured through a plurality of CCTV cameras installed in designated zones across a plurality of regions, and an image analysis server 200 configured to update an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera.

Here, the reference image refers to an image captured in advance with an optimal camera angle of view, zoom, and focus preset to be suitable for analysis such as object detection, tracking, and event detection using the AI image analysis model in the corresponding zone. The reference image may be manually set, registered, and stored by the operator in advance, and may also be modified as needed.

In addition, the CCTV image collection unit 100 may include: a CCTV camera configured to capture images of the designated zones; and an image collection unit configured to collect the captured images and transmit the collected images to the image analysis server 200.

In an exemplary embodiment, the image collection unit may transmit the captured images by the CCTV camera to the image analysis server 200 using dual RTSP (Real-Time Streaming Protocol). Alternatively, the image collection unit may transmit the captured images to the image analysis server through a video management system (VMS) 120. Alternatively, the image collection unit may transmit only the analysis results after preprocessing and analysis to the image analysis server 200 through the edge device 130.

Here, the CCTV camera is a camera device that captures designated zones and provides real-time video, and the CCTV camera may be installed in multiple regions to monitor various areas.

The CCTV camera may include fixed-type cameras as well as pan-tilt-zoom cameras.

The video management system (VMS) 120 is a system for managing CCTV images via a software development kit (SDK), and CCTV images can be retrieved from the VMS using the SDK.

In other words, images can be collected and processed through the SDK of the VMS, and integrated with cameras using protocols such as open network video interface forum (ONVIF) or real time streaming protocol (RTSP) to collect video streams.

Therefore, the image collection unit may perform the function of transmitting the CCTV image received via the VMS, which is connected to the CCTV cameras, to the image analysis server 200.

In another exemplary embodiment, an edge device 130 or a computing device may be installed at the CCTV network site to directly process field data, including CCTV images captured by the CCTV camera, on-site. This allows for the reduction of time and cost associated with transmitting data to the image analysis server 200.

That is, the edge device 130 may be installed in proximity to the CCTV camera to collect real-time CCTV images and perform partial preprocessing, thereby reducing network load and enabling real-time data processing.

In addition, the image collection unit may include a configuration in which the CCTV camera transmits CCTV images using dual RTSP.

RTSP (Real-Time Streaming Protocol) is a protocol for streaming video data in real time, and dual RTSP refers to a configuration in which two streaming sessions are used, allowing one session to be used for data analysis. This approach supports fast data processing with minimal real-time transmission latency.

In addition, as shown in FIG. 3, the image analysis server 200 may include a reception unit 210, an image database 220, an AI preprocessing model unit 230, a camera status determination unit 240, an alarm unit 250, a camera control unit 260, an optimization unit 270, and an analysis unit 280.

The image database (image DB) 220 may be a database device configured to store CCTV images received from the CCTV image collection unit 100. In other words, the image DB 220 functions as a central repository for image data and provides data that can be used by the AI preprocessing model and the analysis model.

In addition, the AI preprocessing model unit 230 may be configured to learn backgrounds and objects based on the CCTV images stored in the image database 220 and the reference images of the corresponding zones that have been preset.

The AI preprocessing model unit 230 learns backgrounds and objects based on the CCTV images stored in the image database 220 and the reference images, and automatically detects and corrects issues such as abnormal zoom, orientation, screen obstruction, or focus failure of the camera, so that the analysis model can perform optimally.

In particular, the AI preprocessing model unit 230 recognizes and learns the fixed background of the image based on the preset reference image, and detects and learns objects (e.g., people, vehicles, etc.) present in the image.

In addition, the AI preprocessing model unit 230 can detect abnormal camera conditions such as zoom, orientation, screen obstruction, and focus failure.

In addition, as shown in FIG. 3, the camera status determination unit 240 may be configured to extract camera status information of the CCTV camera from the data generated by the AI preprocessing model unit 230.

That is, the camera status determination unit 240 may determine whether the camera's status is normal or abnormal, and may extract camera status information such as zoom information, angle of view information, screen obstruction information, and focus information.

The camera control unit 250 may be configured to generate a camera control command signal to restore the CCTV camera to a state corresponding to the reference image based on the status information determined to be abnormal, and to transmit the control command signal to the CCTV image collection unit.

That is, when the camera status information determined by the camera status determination unit is abnormal, the camera control unit 250 may generate a control command signal based on the camera status (e.g., angle of view, focus, zoom, etc.) that caused the abnormality, and may transmit the control command signal to the CCTV image collection unit to restore the camera control status (e.g., angle of view, focus, zoom, etc.) to the camera status of the preset reference image.

Here, the control command signal of the camera control unit may be transmitted to the VMS or the edge device, which then adjusts the camera's status (angle of view, focus, zoom, etc.) to return it to the normal state. Alternatively, the image analysis server may directly transmit the control command signal to the CCTV camera for recovery control.

The alarm unit 260 may be configured to generate alarm information when the camera status determination unit 240 determines that the camera status is abnormal. In this way, the system enables the operator to recognize and respond to the issue immediately.

The optimization unit 270 may be configured to update the AI CCTV image analysis model based on the data learned by the AI preprocessing model unit 230.

In particular, the optimization unit 270 may be configured to tune and improve the AI analysis model so that the AI analysis model can make optimal performance. The optimization unit 270 may optimize the model's parameters using the learned data and update the model to improve its accuracy and reliability.

That is, the optimization unit learns the background and objects in scenes where the camera's angle of view, focus, or zoom has changed, using the AI preprocessing model, and updates the analysis model based on the generated data. This allows the analysis model to maintain or improve its accuracy and performance in detecting events and tracking specific objects, even when unexpected changes occur in the image-capturing environment.

The analysis unit 280 may be configured to analyze the CCTV images using the updated AI image analysis model.

That is, the analysis unit 280 not only detects specific objects within the image and analyzes their behavior, but can also detect specific events (e.g., intrusion, accident, etc.).

As shown in FIG. 4, the artificial intelligence image analysis system using a preprocessing model of CCTV camera image data according to an exemplary embodiment of the present disclosure performs the following operations:

1) Image Collection: CCTV cameras installed in various regions capture CCTV images. The captured images may be transmitted directly to the image analysis server 200, or transmitted via the VMS 120 or edge device 130.

2) Data Transmission: The VMS 120 and edge device 130 may transmit the collected images to the image analysis server 200, or directly transmit the collected CCTV images to the image analysis server 200 using the RTSP protocol.

3) Image Analysis: The image analysis server 200 analyzes the received CCTV images using the AI preprocessing model, learns backgrounds and objects, determines the status of the camera, and analyzes the CCTV images using the updated or optimized AI model.

4) Result Processing: The analyzed image data may be transmitted to a filtering control server and a search server. The filtering control server may detect specific events and generate alerts.

In addition, the search server may store the analyzed data and provide a service that allows the operator to retrieve the data when needed.

As shown in FIG. 5, the artificial intelligence image analysis system using a preprocessing model of CCTV camera image data according to an exemplary embodiment of the present disclosure may be configured as a network connection structure including a private information network section, a center firewall, and an integrated CCTV control center.

The private information network section may include CCTV cameras and edge devices 130, which are installed in various regions and are configured to collect CCTV image data.

Here, the edge device 130 may preprocess the data in real time at the site to reduce network load and enable real-time processing.

The center firewall is a security device that securely transmits the data collected from the private information network to the integrated CCTV control center while maintaining the integrity and security of the data.

The integrated CCTV control center may include a VMS server, disk storage, an image analysis server 200, and an operator PC. The integrated CCTV control center centrally manages and stores the CCTV image data transmitted from the private information network section and stores the collected image data using disk storage.

The image analysis server 200 may receive data from the VMS server, analyzes the CCTV images using the AI preprocessing model, learn the background and objects, and derive high-quality analysis results using an optimized analysis model.

The selective surveillance server, which may be also referred to as filtering control server, detects specific events based on the analyzed data and generates alarms, allowing the operator to monitor and respond to events in real time.

The operator PC allows the operator to monitor and manage data in real time through the PC connected to the VMS server, the image analysis server 200, and the filtering control server, enabling the operator to quickly identify and respond to abnormal situations through real-time monitoring.

As such, the network structure applied to the system according to the embodiment of the present disclosure is configured such that the CCTV cameras and edge devices 130 transmit the data collected through the private information network to the integrated CCTV control center, and the data is securely transmitted through the center firewall. In addition, the data is managed and analyzed by the VMS server and the image analysis server 200, while the filtering control server detects specific events and supports the operator's real-time response.

This network structure can significantly improve the reliability of CCTV image data and the efficiency of analysis.

FIG. 6 is a flowchart illustrating the detailed process of the artificial intelligence image analysis method using a preprocessing model of CCTV camera image data according to an exemplary embodiment of the present disclosure.

As shown in FIG. 6, the artificial intelligence image analysis method using a preprocessing model of CCTV camera image according to an exemplary embodiment of the present disclosure may comprise: (a) collecting, by a CCTV image collection unit 100, images captured through a plurality of CCTV cameras installed in designated zones across a plurality of regions (S100); and (b) updating, by an image analysis server 200, an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera (S200).

Here, the step (a) (S100) may include: (a1) transmitting, by the image collection unit, the captured images to the image analysis server through a video management system (VMS) or an edge device; or (a2) transmitting, by the CCTV camera, the captured images to the image analysis server using dual RTSP (Real-Time Streaming Protocol) (S120).

In addition, the step (b) (S200) may include: (b1) an image storage step (S210); (b2) a preprocessing step (S220); (b3) a camera status information extraction step (S230); (b4) an alarm information generation step (S240); (b5) a CCTV camera recovery step (S250); (b6) an optimization step (S260); and (b7) an image analysis step (S270).

In particular, the step (b1) (S210) may be a step in which the image database 220 stores CCTV images received from the CCTV image collection unit 100.

The preprocessing step (b2) (S220) may be a step in which the AI preprocessing model unit learns the background and objects in the corresponding zone based on the CCTV images stored in the image database 220 and a preset reference image.

The camera status information extraction step (b3) (S230) may be a step in which the camera status determination unit 240 extracts camera status information of the CCTV camera from the data generated by the AI preprocessing model unit 230.

The alarm information generation step (b4) (S240) may be a step in which the alarm unit 260 generates alarm information when the camera status determination unit 240 determines that the CCTV camera status is abnormal.

The CCTV camera recovery step (b5) (S250) may be a step in which the camera control unit 250 generates a camera control command signal to restore the CCTV camera to a status corresponding to a preset reference image based on the abnormal status information, and transmits the signal to the CCTV image collection unit 100 to recover the CCTV camera 110.

The optimization step (b6) (S260) may be a step in which the optimization unit 270 trains and updates the AI CCTV image analysis model based on the data learned by the AI preprocessing model unit 230.

The image analysis step (b7) (S270) may be a step in which the analysis unit 280 analyzes the CCTV images using the updated AI image analysis model.

In addition, another exemplary embodiment of the present disclosure may include a computer program stored on a non-transitory medium for executing the artificial intelligence image analysis method using a preprocessing model of CCTV camera image data.

Further, the program applicable to the method for distribution anomaly prediction for new mineral exploration using mineralogical understanding and artificial intelligence analysis of geochemical data according to an exemplary embodiment of the present disclosure may be implemented as computer-readable code on a computer-readable recording medium. The code and code segments implementing the above programs can be readily deduced by a computer programmer of ordinary skill in the art.

Here, a computer-readable recording medium may include any kind of recording device that stores data that can be read by a computer system. Examples of computer-readable recording media may include ROM, RAM, CD-ROM, magnetic tape, floppy disk, optical disk, and the like. Further, the computer-readable recording medium may be distributed across a networked computer system and may be written and executed as computer-readable code in a distributed manner.

Hereinafter, the development process of the artificial intelligence image analysis system and method using a preprocessing model of CCTV camera image data according to an embodiment of the present disclosure will be described in detail with reference to the drawings.

The artificial intelligence image analysis system and method using a preprocessing model of CCTV camera image data according to an embodiment of the present disclosure proposes an optimized system and method that improves object detection rates in environments with no background changes, enhances understanding of object behavior to increase image analysis efficiency, and minimizes false positives and missed detections in the AI analysis model.

FIG. 7 is a schematic diagram showing an application example of the artificial intelligence image analysis system and method using a preprocessing model of CCTV camera image data according to an exemplary embodiment of the present disclosure.

As shown in FIG. 7, commercial software models based on neural networks and custom software models utilizing machine learning proceed in different directions based on self-learning. In this context, the portion to be handled by the preprocessing artificial intelligence model according to the present disclosure is indicated by red arrows.

That is, to analyze CCTV images, a target region and service are selected, followed by the selection of a camera installed in the corresponding region (mainly fixed-type CCTV cameras). Conventionally, either a general-purpose AI analysis model was applied, or a custom software analysis model was used in which the model was pre-trained and then optimized using the learned data.

However, even in the case of fixed-type CCTV cameras, there were issues where abnormal CCTV image data was collected due to factors such as zoom, orientation, screen obstruction, or poor focus, resulting in reduced performance and accuracy of the analysis model.

To address this, the present disclosure provides a system and method that improves the performance of the AI image analysis model by applying a preprocessing AI model prior to the application or optimization of a general-purpose AI model. The preprocessing AI model identifies camera status information such as zoom, orientation, screen obstruction, or poor focus, and either generates an alarm, excludes the corresponding image, or performs preprocessing such as prior learning of background and objects, thereby enabling optimization of the neural network-based AI analysis model.

FIG. 8 is a flowchart illustrating the processing procedure of the AI preprocessing model applied in the artificial intelligence image analysis method using CCTV camera image data according to an exemplary embodiment of the present disclosure.

As shown in FIG. 8, in order to apply the AI preprocessing model according to an exemplary embodiment of the present disclosure, a reference angle and a reference image of the target camera are selected at first, and a fixed reference time and cycle are determined. Thereafter, the system periodically checks the normality of the camera status by performing comparative calculations against the reference screen. When the result is normal, a logging is expressed. Otherwise, when the result is abnormal, an alarm is triggered. In this process, the OpenCV library may be used to determine whether the images match.

FIG. 9 is a diagram exemplifying how the artificial intelligence image analysis method using a preprocessing model of CCTV camera image data according to the present disclosure can be applied from the perspective of a CCTV control center.

As shown in FIG. 9, from the perspective of a CCTV control center, there may be three methods by which the artificial intelligence analysis method using the preprocessing model according to the present disclosure can be applied, as follows:

1) A method in which images are received and processed through the SDK (Software Development Kit) of a Video Management System (VMS);
2) A method in which the camera transmits images via dual RTSP, and one of the streaming sessions is received and used; and
3) A method in which an edge terminal is installed within the internal network of the CCTV site, and the edge terminal itself operates using the AI preprocessing model.

These three application methods can be compared as shown in [Table 1] below.

In terms of manageability including source code deployment and updates, method (1) using the VMS demonstrates the best performance.

Method (2), which uses RTSP, has the disadvantage of requiring separate management of camera-specific addresses, but provides lower transmission latency compared to the VMS.

Finally, method (3), which uses an edge device 130, is less convenient in terms of management such as deployment and updates, and may incur higher setup costs, but it is the most suitable for real-time processing and has the advantage of imposing minimal load on infrastructure.

TABLE 1

| Category | VMS | RTSP | Edge |
|---|---|---|---|
| Deployment / Management | More convenient | Convenient | Difficult |
| Installation Cost | Low | | Relatively high |
| Transmission Delay | High | Low | Almost none |
| Network Load | 2x | 2x | 1x |
| Reliability | Excellent | Excellent | Very excellent |

The advantages of the artificial intelligence image analysis system and method using a preprocessing model of CCTV camera image data according to the present disclosure are as follows:

1) Improved Reliability: The AI preprocessing model automatically detects and corrects abnormal conditions of the camera such as zoom, orientation, screen obstruction, and focus failure, thereby maintaining consistency in the CCTV images. This improves the accuracy of background and object detection, and when an abnormal condition is detected, an alarm is immediately generated to enable prompt operator response, thereby enhancing the overall system reliability.
2) Increased Efficiency: By preprocessing data in real time at the site through the edge device 130, the load on the image analysis server 200 is reduced, and fast data processing becomes possible. Furthermore, by performing some preprocessing on the edge device 130 before data transmission, the amount of data transmitted to the image analysis server 200 can be reduced.
3) Enhanced Analysis Performance: The AI analysis model can be updated or optimized based on the data learned through the AI preprocessing model, which enables high-quality analysis results. Even when camera status changes, the optimized model can still perform stable and accurate analysis.
4) Operational Convenience: All CCTV images can be centrally managed through the VMS server, and if necessary, the image data can be efficiently analyzed in connection with the image analysis server 200. The operator can check the video in real time through the monitoring system and respond immediately to abnormal situations.
5) Cost Reduction: By applying a low-power, low-heat ARM CPU, operational costs can be reduced. In addition, the automated alarm and status detection system helps reduce the burden on operating personnel and lowers labor costs.
6) Standardization and Scalability: By using standardized integration protocols (e.g., API, CGI, RTSP), the system can be applied in various environments. This improves the scalability of the system and ensures reliability by complying with the guidelines for the construction and operation of intelligent CCTV systems provided by the Ministry of the Interior and Safety, and by verifying standard service models.
7) Event Detection and Response: Through the filtering control server, specific events (e.g., intrusion, accidents, etc.) can be detected and alarms can be generated, enabling operators to respond quickly. In addition, the search server can store analyzed data, and operators can retrieve and analyze video from specific time periods when needed.
8) System Integration: All video can be centrally managed and analyzed at the integrated CCTV control center, improving operational efficiency. The overall efficiency of system operation can be enhanced by integration with various servers such as VMS server, image analysis server 200, filtering control server (selective surveillance server), and search server.

In the above, although several preferred embodiments of the present disclosure have been described with some examples, the descriptions of various exemplary embodiments described in the "Specific Content for Carrying Out the Invention" item are merely exemplary, and it will be appreciated by those skilled in the art that the present disclosure can be variously modified and carried out or equivalent executions to the present disclosure can be performed from the above description.

In addition, since the present disclosure can be implemented in various other forms, the present disclosure is not limited by the above description, and the above description is for the purpose of completing the disclosure of the present disclosure, and the above description is just provided to completely inform those skilled in the art of the scope of the present disclosure, and it should be known that the present disclosure is only defined by each of the claims.

LIST OF REFERENCE NUMBERS

100: CCTV image collection unit
110: CCTV camera
120: video management system (VMS)
130: edge device
200: image analysis server
210: reception unit
220: image database (image DB)
230: AI preprocessing model unit
240: camera status determination unit
250: camera control unit
260: alarm unit
270: optimization unit
280: analysis unit

What is claimed is:

1. An artificial intelligence image analysis system using a preprocessing model of CCTV camera image data, the system comprising:

a CCTV image collection unit configured to collect images captured through a plurality of CCTV cameras installed in designated zones across a plurality of regions; and an image analysis server configured to update an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera, and wherein the image analysis server includes:

an image database configured to store the images received from the CCTV image collection unit;

an AI preprocessing model unit configured to learn the backgrounds and the objects in the designated zones based on the images stored in the image database and the reference image;

a camera status determination unit configured to extract the status information of the CCTV camera from data generated by the AI preprocessing model unit;

an alarm unit configured to generate alarm information when the camera status determination unit determines that a status of the CCTV camera is abnormal;

a camera control unit configured to generate a camera control command signal for restoring the status of the CCTV camera to a status corresponding to the reference image based on the status information of the CCTV camera determined as abnormal, and transmit the camera control command signal to the CCTV image collection unit;

an optimization unit configured to update the AI CCTV image analysis model by training the AI CCTV image analysis model based on data learned by the AI preprocessing model unit; and an analysis unit configured to analyze the images by using the updated AI CCTV image analysis model.

2. The system of claim 1, wherein the image collection unit is configured to:

transmit the captured images to the image analysis server through a video management system (VMS) or an edge device; or transmit the captured images by the CCTV camera to the image analysis server using dual RTSP (Real-Time Streaming Protocol).

3. The system of claim 1, wherein the status information of the CCTV camera includes at least one of zoom information, angle of view information, screen obstruction information, focus information, or a combination thereof, of the image captured by the CCTV camera.

4. An artificial intelligence image analysis method using a preprocessing model of CCTV camera image data, the method comprising:

(a) collecting, by a CCTV image collection unit, images captured through a plurality of CCTV cameras installed in designated zones across a plurality of regions; and (b) updating, by an image analysis server, an AI CCTV image analysis model to analyze the images by using an AI preprocessing model, wherein the AI preprocessing model is configured to receive raw images collected by the CCTV image collection unit, learn backgrounds and objects in the images based on a reference image of the captured images of the designated zones, and check status information of the CCTV camera, and wherein the step (b) includes:

(b1) storing, by an image database, the images received from the CCTV image collection unit;

(b2) learning, by an AI preprocessing model unit, the backgrounds and the objects in the designated zones based on the images stored in the image database and the reference image;

(b3) extracting, by a camera status determination unit, status information of the CCTV camera from data generated by the AI preprocessing model unit;

(b4) generating, by an alarm unit, alarm information when the camera status determination unit determines that a status of the CCTV camera is abnormal;

(b5) generating, by a camera control unit, a camera control command signal for restoring the status of the CCTV camera to a status corresponding to the reference image based on the status information of the CCTV camera determined as abnormal, and transmitting the camera control command signal to the CCTV image collection unit;

(b6) updating, by an optimization unit, the AI CCTV image analysis model by training the AI CCTV image analysis model based on data learned by the AI preprocessing model unit; and (b7) analyzing, by an analysis unit, the images by using the updated AI CCTV image analysis model.

5. The method of claim 4, wherein the step (a) includes:

(a1) transmitting, by the image collection unit, the captured images to the image analysis server through a video management system (VMS) or an edge device; or (a2) transmitting, by the CCTV camera, the captured images to the image analysis server using dual RTSP (Real-Time Streaming Protocol).

6. The system of claim 4, wherein the status information of the CCTV camera includes at least one of zoom information, angle of view information, screen obstruction information, focus information, or a combination thereof, of the image captured by the CCTV camera.

7. A computer program stored in a non-transitory computer-readable medium for executing the artificial intelligence image analysis method using a preprocessing model of CCTV camera image data according to claim 4.

* * * * *